UNITED STATES PATENT OFFICE.

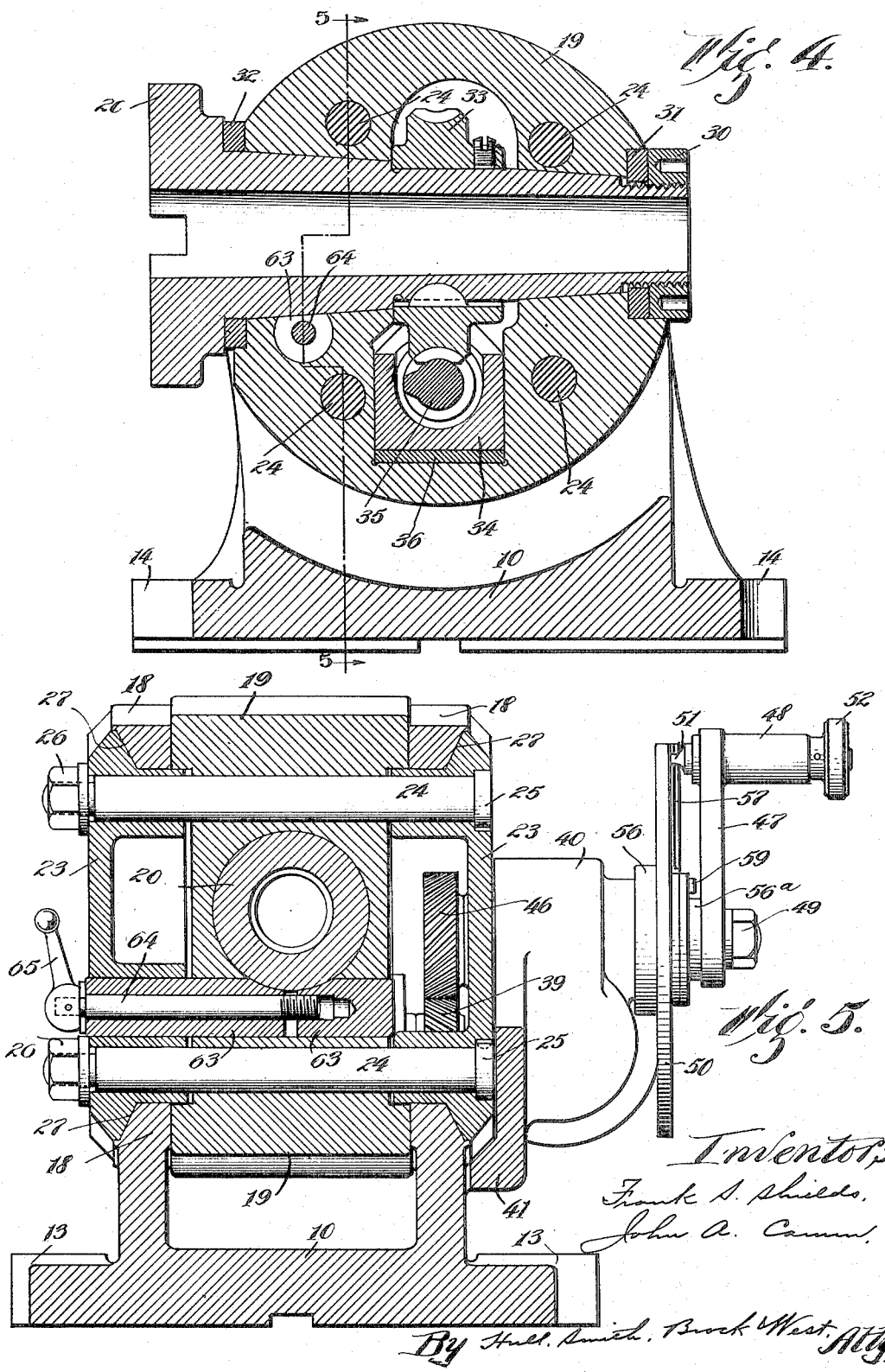

FRANK S. SHIELDS AND JOHN A. CAMM, OF CLEVELAND, OHIO.

DIVIDING-HEAD FOR MILLING-MACHINES.

1,312,277.  Specification of Letters Patent.  Patented Aug. 5, 1919.

Application filed August 6, 1917. Serial No. 184,551.

*To all whom it may concern:*

Be it known that we, FRANK S. SHIELDS and JOHN A. CAMM, citizens of the United States, residing at Cleveland, in the county of Cuyahoga and State of Ohio, have invented a certain new and useful Improvement in Dividing-Heads for Milling-Machines, of which the following is a full, clear, and exact description, reference being had to the accompanying drawings.

This invention relates to machine tools and especially to milling machines embodying a dividing or indexing head for indexing the work either by hand or automatically during the operation of the machine. The invention relates more particularly to the indexing head and involves improvements therein whereby the spindle carried thereby may be more accurately indexed than has hitherto been possible and also whereby the angular position of the spindle in a vertical plane may be adjusted within certain limits and the spindle more securely fixed and clamped in the adjusted position. The invention also contemplates certain structural improvements whereby the parts may be quickly and easily assembled. Other improvements will hereinafter appear.

Figure 1:
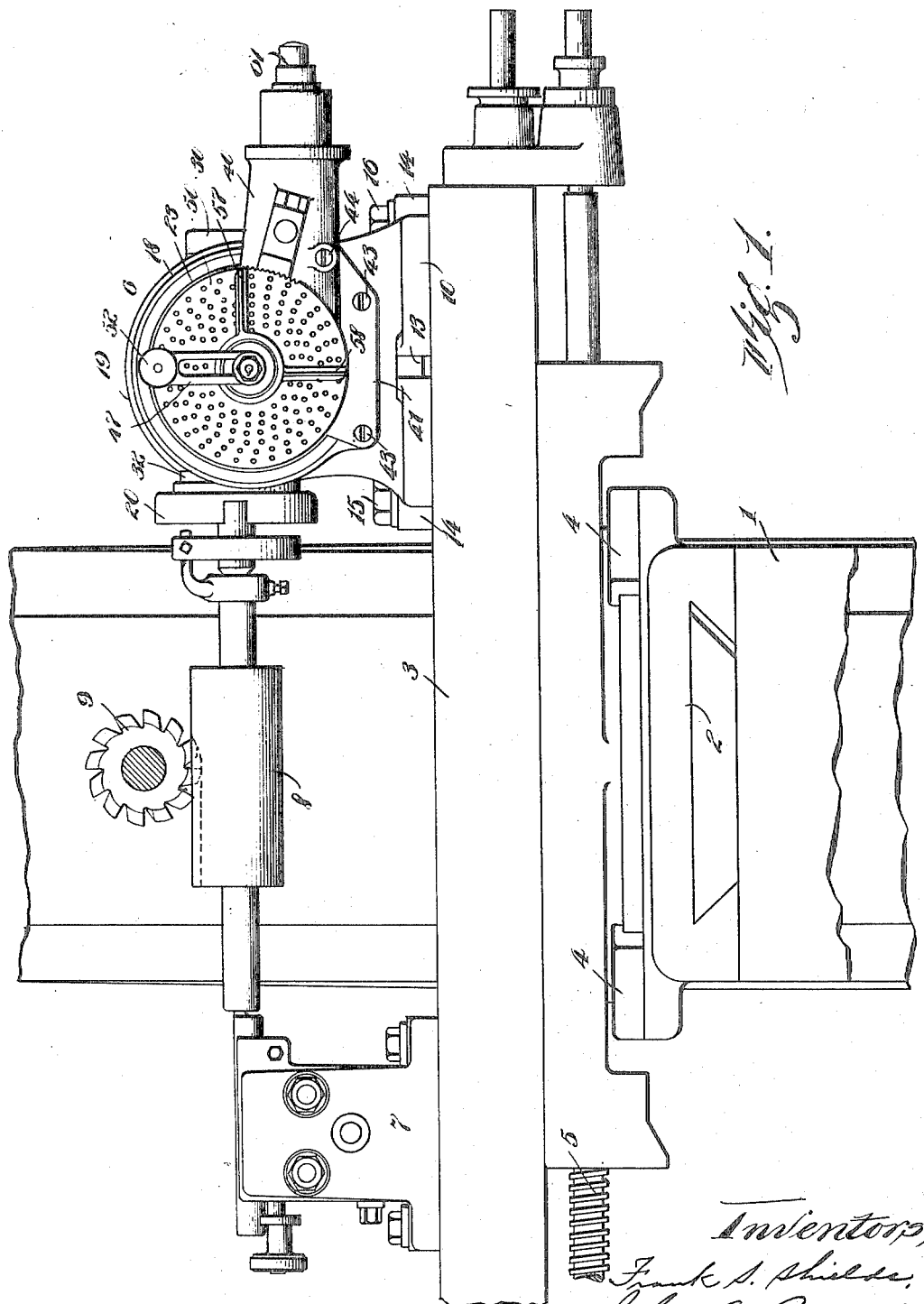
Figure 2:
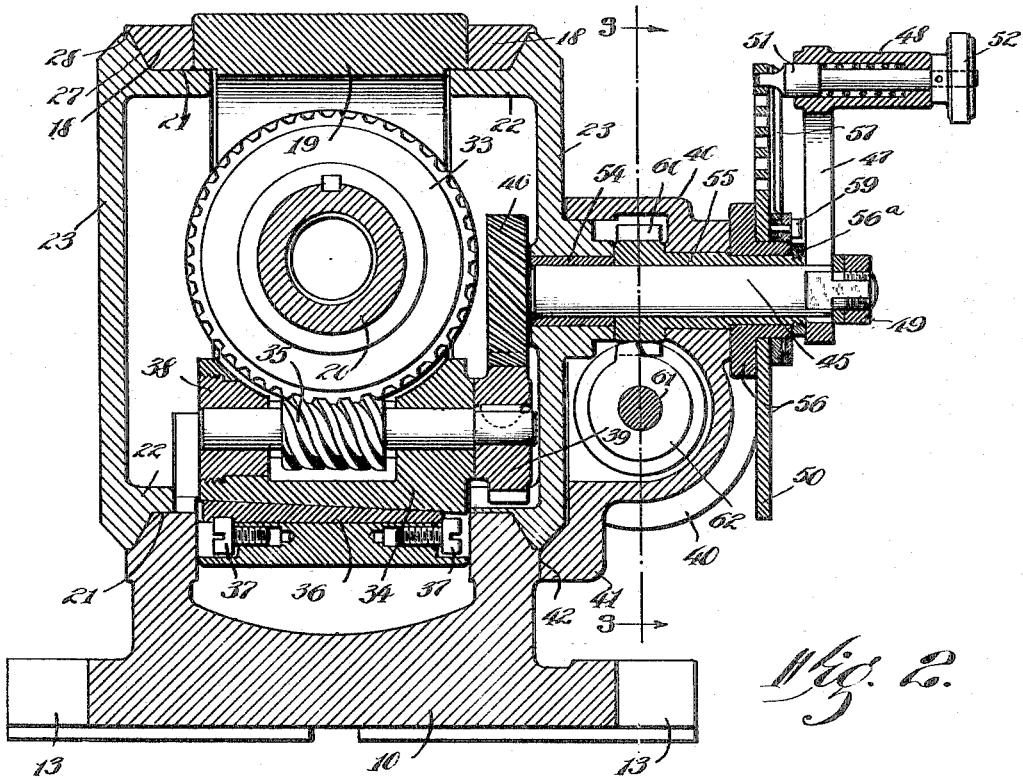
Figure 3:
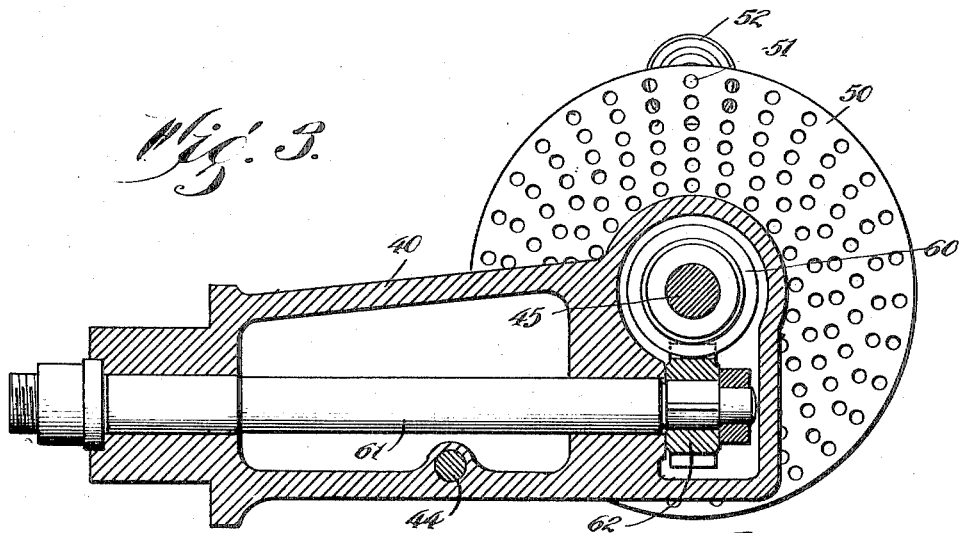

For a better understanding of the various advantages of this invention, reference may be had to the drawings accompanying this application wherein Figure 1 is an elevational view of a longitudinally adjustable table embodied in a milling machine; Fig. 2 is a sectional view at right angles to the spindle of the dividing head; Fig. 3 is a sectional view through the casing carrying a driving shaft for the spindle; Fig. 4 is a longitudinal sectional view of the dividing head through the spindle; and Fig. 5 is a cross sectional view on the line 5—5 of Fig. 4.

Referring to the drawings where like numerals refer to similar parts throughout, a portion of the base of a milling machine 1 is illustrated which carries thereon a saddle 2, the saddle 2 being dovetailed to the base or knee 1 for adjustment thereon. The saddle 2 in turn carries a table 3, the table 3 being swiveled to the top of the saddle for pivotal or turning movement on the circular guides 4. The table 3 is longitudinally adjustable by means of a feed screw shaft 5 and other adjusting mechanisms not illustrated in the drawings. The table 3 carries thereon a dividing head indicated generally at 6 and a tailstock indicated generally at 7, the work 8 being carried between the tailstock and the head and being worked on by the milling cutter 9.

The dividing head 6 comprises a supporting base 10 which rests on the table 3 and is adapted to be fixed thereto in alinement with the tailstock 7. This base 10 is provided on opposite sides thereof with two pairs of lugs 13 and 14 extending outwardly therefrom, these lugs 13 and 14 being provided with vertical slots therein for receiving clamping bolts 15 and 16 which pass through the slots and engage coöperating clamping parts on the table 3, as for instance T-slots therein (the latter not being illustrated). The base 10 is formed with, preferably integral therewith, two spaced upright guide rings 18 which have inner and opposed plane bearing faces. These rings 18 receive in a close fitting manner an angularly adjustable head 19, the bearing surfaces of the latter also being plane and coöperating with the bearing surfaces of the rings 18. This head 19 in turn, carries a spindle 20, the latter with the head 19, as will hereinafter appear, being angularly adjustable with reference to the horizontal in a vertical plane and the head being adapted to be securely clamped between the flat bearing faces of the rings 18 in any adjusted position. The rings 18 are provided with cylindrical inner surfaces 21 and within these rings are disposed the cylindrical flanges 22 of the circular carrying and clamping plates 23. The plates 23 have registering transverse openings therein for the reception of clamping bolts 24. In the specific embodiment illustrated, there are four of such clamping bolts which pass through the openings in plates 23 and through corresponding and registering openings in the head 19, whereby the head is carried by the clamping plates 23 and bolts 24, the bolts 24 being provided on one end with heads 25 resting in recesses formed in the face of one of the plates, and having on the other end clamping nuts 26 which engage the opposite plate 23 to hold the plates, head, and bolts in the assembled position. The circular flanges 22, formed integrally with the plates 23 and resting within the cylindrical rings 18, form guides for the angular adjustment of the head 19 and spindle 20 in the vertical plane. The spindle may thus be given any angular adjustment desired and after the adjustment the clamping plates 23 may be drawn toward each other by means of the clamping bolts 24 to securely clamp the plates to the rings 18 and to the head 19 to retain the same in a fixed position for coöperation with the tailstock in holding the work 8. The clamping or gripping action between the plates 23 and rings 18 is substantially augmented in the present embodiment of this invention by tapering the engaging surfaces of the clamping members, the outer edges 27 of the rings 18 being tapered inwardly and the corresponding engaging surfaces of the plates 23 being tapered outwardly. By this tapering or beveled arrangement of engaging surfaces there is brought about a sort of wedging and gripping action between the plates 23 and the rings 18, resulting in a rigid assembly of the parts when the bolts are tightened. The inwardly tapering surface or face 27 of the rings 18 connects the inner cylindrical surface 21 with another cylindrical surface 28, the latter being formed by an annular shoulder surrounding and fitting onto the periphery of the circular plates 23. By loosening the bolts 24 the head 19 and the spindle 20 may be adjusted to any angular position within certain limits with reference to the horizontal and in a vertical plane, and by means of the particular arrangement of clamping plates and upright rings, and the particular shape of the engaging faces thereof, the parts are easily and quickly clamped together into a rigid structure.

The spindle 20 is of the usual tapered shape and is journaled in a corresponding opening in the head 19. The smaller end of this spindle 20 is provided with an external screw thread for the reception of a clamping nut 30, the latter resting against a bearing ring 31 surrounding the spindle, which in turn, rests in a corresponding recess on the end of the head 19. On its larger end, the spindle 20 carries a similar bearing ring 32 which also rests in a recess formed in the head 19 and bears against the flat bearing surface of a shoulder formed on the spindle. Midway of its length the spindle is provided with a spiral gear 33, the latter being fixed to the spindle and reposing in an opening formed in the head 19 at right angles to the spindle. The lower part of this opening is rectangular in shape and carries disposed therein a similarly shaped bearing block or structure 34, the latter carrying a worm 35 in mesh with the spiral gear 33. The bearing structure 34 has a tapered under side with which coöperates a reversely tapered wedge member 36, the latter resting on the bottom of the opening through the head and being adjustable back and forth by means of set screws 37, whose heads rest in recesses formed on the sides of the head 19 and which are screw threaded in openings therein, the head of one of the set screws 37 engaging the small end of the tapered member 36, while the head of the other set screw 37 rests in a recess formed on the bottom of the other end thereof. By adjusting these set screws 37, it is obvious that the member 36 may be adjusted back and forth to compensate for wear and to tighten the parts and take up any lost motion therein, the adjustment of the member resulting in raising and lowering the bearing structure. The bearing structure 34 is provided with a central recess therein for the reception of the worm 35, and on one end thereof in alinement with the worm, this bearing structure is provided with an internally threaded opening for the reception of a bearing member 38, the bearing member 38 having external screw threads coöperating with the internal threads of the opening, whereby the bearing 38 may be inserted or withdrawn through the bearing structure 34 to assemble or disassemble the worm 35 and its shaft. The worm shaft has one end overhanging the bearing structure 34 and has keyed to this overhanging end a gear 39 through which power is transmitted to the worm 35 to adjust or drive the spiral gear 33 and spindle 20. Power may be transmitted to the gear 39 through gearing and control devices now to be described. The plate 23 adjacent the gear 39 carries bolted thereto an elongated casing 40 disposed parallel with the spindle and extending rearwardly therealong. This casing 40 is provided with a downwardly depending horizontal flange 41 whose inner surface is formed to fit loosely onto the lower tapered edge of plate 23, this flange 41 also having a vertically disposed flat bearing face 42 engaging a corresponding bearing face on the lower part of the ring 18. The casing 40 may be conveniently held in position by bolts 43 passing through this flange 41 and entering the ring 18. The lower part of the casing 40 may be also provided midway of its length with an apertured boss therein and have disposed in the aperture a bolt 44, which also enters the ring 18 and serves to help retain the elongated casing 40 in position thereon. The plate 23 has an opening in its center and in alinement therewith is an opening on the outer side of the casing 40 and in these two registering openings is journaled a horizontal shaft 45 which carries on an overhanging end within the plate 23 a gear 46 which meshes with the gear 39, the gear 46 being fixed to the shaft. On the outer end of the shaft 45 is disposed a crank arm 47 with an operating handle 48 thereon. The handle 48 and crank arm 47 are fixed to each other and the crank arm 47 is slotted longitudinally of its length to receive the squared outer end of the shaft 45. The outer end of the shaft 45 is provided with a clamping nut 49 for fixing the crank arm 47 to the shaft in any adjusted position, it being understood that the arm 47 may be adjusted longitudinally of its length and transversely of the shaft 45 by means of the slot therein. Through the operation of the handle 48 and crank 47, the shaft 45 may be rotated to transmit movement to the spindle 20, power being transmitted through the gears 46 and 39, worm 35, and spiral gear 33 whereby the spindle may be rotated or given any portion of a revolution desired.

For accurately indexing the spindle 20, the usual index plate or disk 50 is provided which is mounted on the shaft 45 and inside of the handle 48 and is provided with circularly arranged apertures therein radiating out from the center of the disk. The handle 48 is hollow and carries a pin 51 projecting outwardly therefrom for engagement with any one of the holes of the circle to which the crank arm 47 and handle 48 have been adjusted. The plunger 51 is movable back and forth within the handle 48 by means of the knob 52 and in the position illustrated, the handle is shown as securely locked to the disk 50 by means of the pin 51 engaging one of the holes therein. The shaft 45 may be given any portion of a turn within limits defined by the size of the disk 50 and number of circles and holes therein. For instance, with the parts adjusted to a circle having 20 holes, the turning of the handle 48 from one hole to the next gives to the shaft 45 one twentieth of a turn, whereas with a circle of 40 holes the movement from one hole to another will give one fortieth of a turn. By using the compound method of indexing, the range of divisions may be considerably extended for a given disk and number of circles and holes therein, as is well known in this art.

The inner end of shaft 45 is provided with a bronze bearing bushing 54, and the outer end is journaled in a sleeve 55, the latter in turn being journaled in the casing 40. To the outer end of the sleeve 55 is fixed another sleeve 56, the latter sleeve having a vertical flange interposed between the disk 50 and a flat bearing surface provided around the opening in the casing 40. The plate or disk 50 is fixed to this latter sleeve 56, and on its outer end the sleeve 55 is provided with external screw threads for receiving a clamping nut 56$^a$.

There is also mounted on the outer end of this sleeve 56 a sector comprising two adjustable radial arms 57 and 58, one of these arms being mounted on a ring embracing the sleeve 56 while the other arm is mounted on a second ring playing in an annular recess formed in the first ring adjacent the plate or disk 50. A set screw 59 is provided for locking the two radial arms together, the purpose of these arms being to assist the operator in accurately indexing the spindle as is well known. The inner end of the sleeve 55 carries a spiral pinion or gear 60, the latter being disposed within the casing 40 and immediately above one end of a drive shaft 61, extending longitudinally of the casing 40. The shaft 61 is horizontally disposed and carries on its inner end a spiral gear 62 which meshes with the pinion 60 on the sleeve 55. The shaft 61 is employed when the spindle 20 is to be automatically driven, as, for instance, in spiral cutting work where the feeding mechanism of the table is connected with the spindle to drive the same with the feeding movement of the table. In the particular embodiment of the invention illustrated herein, the spindle is indexed by hand and accordingly the mechanism for gearing the shaft 61 up to the feeding mechanism of the table, is not illustrated herein. It is understood, however, that by driving the shaft 61, movement is transmitted therethrough, and through the spiral pinions 60 and 62 to the sleeve 55, and through the sleeve 55 to the plate or disk 50, which is fixed thereto, and from the plate 50 through the locking pin 51, crank arm 47 and shaft 45, thus providing a very convenient, simple and sure drive for the spindle when the automatic drive is used.

The spindle 20 may be securely and nonrotatively locked in any adjusted position by means of two coöperating clamping plungers 63 which are disposed respectively on opposite sides of the spindle and in a transverse opening in the head below and at right angles to the spindle. The inner of these plungers has an internally threaded opening in its inner end and the outer plunger is provided with a central longitudinal opening therethrough in alinement with the threaded opening for the reception of a bolt 64, the latter having its inner end threaded to enter the threaded opening of the inner plunger and having a handle 65 on its outer end whereby the bolt may be rotated to draw the plungers tightly against the periphery of the spindle. The outer plunger 63 passes outwardly through the clamping plate 23 to afford access to the handle 65.

By the arrangement herein set forth, it is noted that regardless of the angle of the head 19 and spindle 20 with reference to the horizontal, the driving gear 39 is at all times in engagement with the gear 46, the pivotal axis of the head 19 being in line with the shaft 45. It is noted, too, that the driving gears 39 and 46 are illustrated as of the spiral and worm type, but it is understood that they may be of the spur type instead. In fact in some instances the spur type of gear is preferred.

Another important feature of this index head is the ease with which the parts thereof may be assembled or disassembled. For instance by removing the casing 40 and the clamping bolts 24, all parts including the clamping plates 23, bearing block 34 and head 19 may be quickly disassembled.

In accordance with the requirements of the patent statutes we have set forth in detail one specific embodiment of our invention, but it is understood that this embodiment is for illustrative purposes only and that the claims hereto annexed are not to be limited thereto except as is specifically recited therein or is rendered necessary by a consideration of the prior art.

Having thus described our invention, what we claim is:—

1. In an apparatus of the type described, the combination of a base and two upright parallel guiding rings thereon, a pair of clamping plates embracing said rings, said rings having their outer edges tapered and said plates having reversely tapered engaging surfaces corresponding to and coöperating with the tapered edges of said rings, a head carried by said plates and adapted to be clamped between said rings, a spindle journaled therein, clamping bolts passing through said plates and head for wedging the clamping plates on to said rings and clamping the head between said rings, and means to turn the spindle.

2. In an apparatus of the type set forth, the combination of a support, a spindle-carrying head mounted in said support, said head having a transverse recess therein, and a bearing structure in said recess, carrying a worm shaft operatively connected to the spindle, said bearing structure being adjustable as a whole toward and from the spindle.

3. In an apparatus of the type set forth, an indexing member comprising a base and two upright guiding rings thereon, a pair of clamping plates fitting against said rings, said plates having wedging engagement with said rings, a spindle-carrying head clamped between said rings and clamping bolts passing through said plates and head for clamping said plates to the said rings.

4. In an apparatus of the type described, a support, a head pivotally mounted therein, a spindle journaled in said head, said head having a transverse recess therein, a bearing structure in said transverse recess, a worm shaft carried by said bearing structure and having a worm gear in mesh with a spiral gear fixed to said spindle, and a drive shaft in alinement with the pivotal axis of the head and extending into the head, said worm shaft and said drive shaft having intermeshing gears thereon within the head.

5. In an apparatus of the type described, a casing, a pivoted indexing head therein, a spindle journaled in said head, a worm shaft carried by said head and geared to said spindle, a drive shaft supported on said casing, a counter shaft journaled in line with the axis of the head, a sleeve journaled on said countershaft, said sleeve and said drive shaft having intermeshing gears thereon, and means for clutching said sleeve to said countershaft, said countershaft and said worm shaft having intermeshing gears thereon.

6. In an apparatus of the type described, the combination of side plates, a head therebetween, a spindle journaled in said head, said head having a transverse opening across said spindle, and two clamping plungers disposed on opposite sides of said spindle and within said opening and adapted to be drawn together to clamp said spindle in a fixed position.

7. In an apparatus of the type described, a pair of clamping plates, a head carried by said plates, a spindle journaled in said head, said head and one of said plates having registering transverse openings therein, and two clamping plungers disposed on opposite sides of said spindle within said openings and adapted to be drawn together to clamp said spindle in a fixed position, one of said plungers extending outwardly through the opening in the clamping plate.

8. In an apparatus of the type described, the combination of a pair of side plates, a head between said plates, a spindle journaled in said head, a worm shaft carried by said head and having a worm gear in mesh with a spiral gear fixed to said spindle, a drive shaft, a counter shaft journaled at the center of one of said plates, said countershaft and said worm shaft having intermeshing gears thereon, a sleeve journaled on said countershaft and having on its inner end a spiral gear in mesh with a similar gear on said drive shaft, said sleeve having on its outer end a perforated indexing disk, and an adjustable crank arm mounted on the outer end of said countershaft and carrying means for clutching said disk thereto.

In testimony whereof, we hereunto affix our signatures.

FRANK S. SHIELDS.
JOHN A. CAMM.